UNITED STATES PATENT OFFICE.

LUDWIG PAUL, OF FÜRSTENBERG-ON-ODER, PRUSSIA, GERMANY.

PRODUCTION OF DISULPHO AND DICARBO ACIDS OF THE DIAMIDOAZO-BENZIDINES.

SPECIFICATION forming part of Letters Patent No. 380,402, dated April 3, 1888.

Application filed August 16, 1887. Serial No. 247,113. (No specimens.) Patented in France January 11, 1887, No. 184,160; in Germany March 4, 1887, No. 3,209 and July 12, 1887, No. 3,339, and in England June 9, 1887, No. 8,296, and June 11, 1887, No. 8,437.

*To all whom it may concern:*

Be it known that I, Dr. LUDWIG PAUL, a citizen of the Empire of Germany, residing at Fürstenberg-on-Oder, in the Kingdom of Prussia, in the German Empire, have invented certain new and useful Improvements in the Production of Disulpho and Dicarbo Acids of the Diamidoazo-Benzidines, of which the following is a specification.

This invention consists in the process or processes of producing mono and diamidoazo-benzidines, transformation of them into tetrazo compounds, and their combination with amines and phenols, or the sulpho-acids of these bodies, and production of colors therefrom.

The tetrazo compounds known up to the present may be combined with aniline, toluidine, xylidine, and cumidine, as well as with the sulpho-acids of these bodies. I know as tetrazo compounds of this species: (*a*) tetrazo-diphenyl, tetrazo-ditolyl, tetrazo-diallyl; (*b*) tetrazo-diphenyl-dicarbon acid and its ethers; (*c*) tetrazo compounds of the ethers of diamido-diphenyl; (*d*) tetrazo-fluorene and tetrazo-stilbene.

A. *Diamidoazo benzidines and colors derived from them.*

Example 1: Ten pounds metadiamidodiphen acid are diazotized, as usual, and mixed with the solution of 13.2 pounds chlorhydrate of alpha or beta naphthylamine in thirty pounds water. After a rest of twelve hours the precipitate is filtered, washed, stirred up in fifty gallons water, and boiled under addition of ammonia, with the alkaline reaction. The ammonia salt thus formed is precipitated by common salt and filtered. If the 13.2 pounds chlorhydrate of naphthylamine are substituted by 6.6 pounds chlorhydrate of alpha-naphthylamine a precipitate is formed with a free diazo group, which may be combined with a second molecule of an amine or phenol. By entering it into an aqueous solution of (*a*) six pounds chlorhydrate of alpha or beta naphthylamine, or (*b*) 4.8 pounds chlorhydrate of aniline, or (*c*) 5.3 pounds chlorhydrate of toluidine, or (*d*) 6.9 pounds chlorhydrate of xylidine, or (*e*) 7.4 pounds chlorhydrate of cumidine, or the equivalent quantities of the sulpho-acids of these bodies, mixed colors are formed which dye the cotton yellowish in alkaline bath.

Example 2: The yellow coloring-matters obtained by example 1, as ammonia salts, are stirred up, still moist, in twenty-five gallons water and four pounds hydrochloric acid and cooled. A solution of 5.2 pounds nitrite of soda is cautiously added, and during a rest of twelve hours a strong nitrous reaction results. The thus-resulting tetrazo compound may be filtered, which is preferable for further combinations with amines, or directly poured into a solution, which must be kept alkaline during the whole process, of twenty-six pounds R. salt of beta-naphthol disulpho-acid, or 18.3 pounds of alpha or beta naphthol monosulphonate of soda. Blue precipitates are produced, dyeing cotton violet.

Example 3: The tetrazo compound formed by ten pounds metadiamidodiphen acid is slowly poured into an aqueous solution of 2 to 4.8 pounds chlorhydrate of aniline, or 2 to 5.3 pounds chlorhydrate of toluidine, or 2 to 6.9 pounds chlorhydrate of xylidine, or 2 to 7.4 pounds chlorhydrate of cumidine, and ammonia cautiously added to the alkaline reaction. If the tetrazo compound had been filtered, it is stirred up with some water. The solution of the chlorhydrate of the amine is added with a quantity (equivalent to three to four molecules hydrochloric acid) of acetate of soda. In both cases yellow precipitates are formed, which are filtered and washed. All these colors are weak coloring-matters for cotton.

Example 4: The moist precipitate resulting from example 3 by the combination of one molecule tetrazo-diphenyl-dicarbon acid and, for instance, two molecules aniline is stirred up in twenty-five gallons water, eighteen pounds hydrochloric acid added, and boiled. After filtering and cooling, the solution is diazotized by 5.2 pounds nitrite of soda. After some rest the solution, which has turned into a brownish-yellow, is poured into an aqueous solution of (*a*) 18.2 pounds naphthionate of soda and the same weight of acetate of soda; after a rest of twenty-four hours it is filtered and poured into ammonia. The coloring-matter formed dyes the cotton red from alkaline bath.

This coloring-matter may be still once diazotized wholly or half. By wholly diazotizing, for instance, scarlet coloring-matters for wool are obtained. Or (b) 26.2 pounds R. salt of betanaphthol disulpho-acid. This mixture is to be kept alkaline. A red coloring-matter results. Or (c) 18.3 pounds soda salt of the alpha or beta naphthol monosulpho-acid. Red orange dyeing-colors are produced.

Example 5: Ten pounds benzidine are diazotized in twenty-five gallons water, 26.5 pounds hydrochloric acid, (thirty per cent.,) and 7.6 pounds nitrite of soda. The solution of tetrazo-diphenyl thus formed is poured onto an aqueous solution of 2 to 9.8 pounds chlorhydrate of alpha or beta naphthylamine, or 2 to 7.1 pounds chlorhydrate of aniline, or 2 to 7.9 pounds chlorhydrate of toluidine, or 2 to 10.2 pounds chlorhydrate of xylidine, or two to eleven pounds chlorhydrate of cumidine, or the equivalent quantities of the sulpho-acids of these bodies, under addition of a quantity of acetate of soda equivalent to three to four molecules of hydrochloric acid. The resulting bodies, as far as they are not obtained from the sulpho-acids of aniline, toluidine, xylidine, and cumidine, are difficult of solution in water and spirit, but may be easily diazotized.

Example 6: The diamidoazo compound resulting from ten pounds benzidine and 14.2 pounds aniline salt is, still moist, stirred up in twenty-five gallons water and thirty pounds hydrochloric acid. After cooling, 7.6 pounds nitrite of soda in aqueous solution are cautiously added and the mixture left for rest twelve hours. The thus-obtained new tetrazo compound is poured into an aqueous solution of one of the following bodies: (a) 26.6 pounds naphthionate of soda, or (b) 37.8 pounds R. salt of beta-naphthol disulpho-acid, or (c) 26.7 pounds soda salt of alpha or beta naphthol monosulpho-acid. (From a a red, from b a blue, and from c a violet coloring-matter for cotton in alkaline bath is produced.)

Example 7: Ten pounds diamidoazo-benzidine,

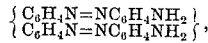

are diazotized, as it is said in Example 6, and the resulting new tetrazo compound is poured into a solution of 5.7 pounds resorcin in twenty-five gallons water and 26.5 pounds ammonia of ten per cent. After a rest of one hour the brownish-yellow precipitate is heated, some salt added, and filtered. The new compound is soluble in lye with an intensive red color, and dyes the cotton red from alkaline bath.

Example 8: By substituting the 5.7 pounds resorcin of the example 7 by 16.3 pounds resorcin disulphonate of soda a blackish-red solution arises, from which the coloring-matter, which dyes a more bluish-red shade than that derived from resorcin, is precipitated by common salt and filtered.

Example 9: If the tetrazo-diphenyl is substituted by the equivalent quantities of (a) tetrazo-diphenyl-dicarbon acid and its ethers, (b) tetrazo-ditolyl and tetrazo-dixylyl, (c) tetrazo compounds of the ethers of diamido-diphenyl, (d) tetrazo-fluorene and tetrazo-stilbene, and treated in the same way as is set forth in examples 1 to 8, aniline coloring-matters are formed.

B. *Monoamidoazo-benzidines and colors derived from them.*

If one molecule of one of the known tetrazo compounds is combined with only one molecule of aniline, toluidine, xylidine, or cumidine, or their sulpho-acids, monoamidoazo-benzidines are produced, which may be still once diazotized and combined either with two molecules of the same or of different amines or phenols, or with one molecule of an amine or phenol.

Example 10: Ten pounds benzidine are diazotized in the usual way, mixed with an aqueous solution of 7.2 pounds acetate of soda, and a solution of 7.1 pounds aniline salt and six pounds acetate of soda in 6.5 gallons water added. A red precipitate is at once formed and filtered after a rest of one hour. This precipitate is stirred up in fifteen gallons water with twenty-four pounds hydrochloric acid and diazotized with 3.7 pounds nitrite of soda. After a rest of some hours the thus-obtained tetrazo compound is poured into an aqueous solution of one of the following bodies: (a) 37.5 pounds R. salt of beta-naphthol disulpho-acid, or (b) 26.3 pounds soda salt of alpha or beta naphthol monosulpho-acid, (in both cases the mixture is to be kept alkaline,) or (c) 26.3 pounds naphthionate of soda and thirty-six pounds acetate of soda. The coloring-matters resulting from these three cases are separated by common salt, filtered, and, if necessary redissolved. They dye cotton in alkaline bath—a, blue; b, violet; c, red.

Example 11: In substituting the 7.1 pounds aniline salt in example 10 by 7.9 pounds chlorhydrate of toluidine, or 10.2 pounds chlorhydrate of xylidine, or 11 pounds chlorhydrate of cumidine, combinations result which may be combined in quite the same way with the same quantities of naphthol disulpho-acids and naphthol monosulpho-acids and naphthionates as is set forth in example 10, and analogous colors are produced. The coloring-matters obtained in examples 10 and 11 derived from the naphthylamine sulpho-acids may be transformed into coloring-matters containing the alpha or beta naphthol sulpho-acids by diazotizing and boiling.

Example 12: In substituting the ten pounds diamidoazo-benzidine of examples 7 and 8 by the equivalent quantities of one of the monoamidoazo-benzidines of examples 10 and 11, similar bodies are produced, dyeing cotton with a more bluish shade.

Example 13: In substituting the ten pounds benzidines of example 10 by the equivalent quantities of (1) metadiamidodiphen acid or its ethers, (2) tolidine or dixylyldiamine, (3) the ethers of diamido-diphenol, (4) diamido-fluorene or diamido-stilbene, or their sulpho-acids, similar bodies as the monoamidoazo-benzidine are produced, which may be also diazotized and combined with the equivalent quantities of R. salt of beta-naphthol disulphoacid, soda salt of alpha or beta naphthol monosulpho-acid, alpha or beta naphthylamine sulpho-acids, or resorcin, and furnish blue, violet, and red coloring-matters which dye cotton in alkaline bath. The monoamidoazo-benzidine described in the preceding examples may be combined with a second molecule of aniline or its homologue, or their sulpho-acids, and furnish thus the same combinations which result from combining one molecule of the tetrazo compounds known direct with two molecules of the respective amines, as is mentioned in examples 1 to 9.

Example 14: The monoamidoazo-benzidine resulting from example 10 is stirred up in water with six pounds acetate of soda and mixed with an aqueous solution of 7.1 pounds aniline salt. After twelve hours rest—sooner by agitating and heating—the red precipitate is transformed into a yellow one of the composition

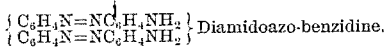

In the same way the combinations resulting from example 13 may be combined with another molecule of aniline, toluidine, xylidine, cumidine, or their sulpho-acids.

C. *Transformation of the monoamidoazo-benzidines into hydroxyl combinations by boiling with water, diazotizing the thus-obtained hydroxyl combinations, and their combination with phenols or amines.*

In combining the known tetrazo compounds mentioned with one molecule alpha or beta naphthol, alpha or beta naphthylamine, aniline, toluidine, xylidine, cumidine, resorcin, or the sulpho-acids of all these bodies, combinations are produced which contain still a free diazo group. This diazo group may be completely transformed into the hydroxyl group (40) by boiling with acidulated water, and in this manner the compounds not soluble in alkali and showing few symptoms of a color nature before are transformed into such soluble in alkali and dyeing the wool.

Example 15: Ten pounds benzidine are diazotized as usual and combined: (a) Under addition of 7.2 pounds acetate of soda, with, first, 1.1 pound chlorhydrate of aniline; or, second, 7.9 pounds chlorhydrate of toluidine; or, third, 10.2 pounds chlorhydrate of xylidine; or, fourth, eleven pounds chlorhydrate of cumidine; or, fifth, 9.8 pounds alpha or beta naphthylamine; or, sixth, 13.3 pounds alpha or beta naphthionate of soda; or, seventh, 9.3 pounds metasulphanil acid. After some rest the mixtures are heated to boiling and the boiling continued until a visible delivery of azote has ceased. Those coloring-matters resulting which are not soluble in water may be made soluble by sulphonation. The coloring-matters obtained dye cotton yellow to red in alkaline bath. (c.) Under addition of 34.5 pounds ammonia, with, eighth, 7.8 pounds alpha or beta naphthol; ninth, 18.8 pounds soda salts of beta-naphthol disulpho-acids; tenth, 13.2 pounds soda salts of alpha or beta naphthol monosulpho-acids, voluminous dark-colored precipitates are formed, which are completely decomposed by boiling. The colors resulting from naphthols are made soluble in water by sulphonation.

Example 16: Coloring-matters containing the naphthol sulpho-acids also result by diazotizing the precipitates from the naphthylamine sulpho-acids and decomposing them by boiling with water. Boiling is, however, not necessary. The precipitate, for instance, from naphthionates in example 15 is mixed with twenty-four pounds hydrochloric acid, 3.7 pounds nitrite of soda, and left for rest twelve hours, then boiled, and the product treated as is said above in example 15; also, the other amines combined with the known or the new tetrazo compounds may be further diazotized and combined anew with phenols or amines.

Having thus described my invention, I claim as new and desire to secure by Letters Patent—

1. The combination of the following tetrazo compounds known at present: (a) tetrazo-diphenyl, tetrazo-ditolyl, tetrazo-dixylyl; (b) tetrazo-diphenyl-dicarbon acid and its ethers; (c) tetrazo compounds of the ethers of diamido-diphenol; (d) tetrazo-fluorene, tetrazo-stilbene, or the sulpho-acids of these bodies, with two molecules aniline, toluidine, xylidine, and cumidine, or their sulpho-acids, and the coloring-matters thereby produced, as set forth.

2. The transformation of the bodies resulting from the combination of the tetrazo compounds known up to the present with two equal or different molecules of alpha or beta naphthylamine or their sulpho-acids, aniline, toluidine, cumidine, xylidine, or their sulpho-acids, into new tetrazo compounds, and the coloring-matters thereby produced, as set forth.

3. The decomposition of those compounds resulting by operation of processes stated in claim No. 2, which contain amines or their sulpho-acids, into compounds containing the corresponding phenols or naphthols, or their sulpho-acids, by boiling water, and the coloring-matters thereby produced, as set forth.

4. The combination of the new tetrazo compound resulting from operation of processes stated in claim No. 2, with (a) alpha or beta naphthol, (b) alpha or beta naphthylamine, or their sulpho-acids, and the coloring-matters thereby produced, as set forth.

5. The combination of one molecule of any of the known tetrazo compounds mentioned in claim No. 1 with only one molecule of aniline, toluidine, xylidine, or cumidine, or their sulpho-acids, and the coloring-matters thereby produced, as set forth.

6. The transformation of the monoamidoazo compounds resulting from the operation of the processes stated in claim No. 5 into diazo compounds, and their combination with alpha or beta naphthol or their sulpho-acids, or alpha or beta naphthylamine or their sulpho-acids, and the coloring-matters thereby produced, as set forth.

7. The diazotization of the diamidoazo compounds resulting from the operation of the processes stated in claim No. 1 and of the monoamidoazo compounds resulting from the operation of the processes stated in claim No. 5, and combination with resorcin or its sulpho-acids, and the coloring-matters thereby produced, as set forth.

8. The transformation of the intermediate products resulting from the combination of one molecule of the known tetrazo compounds mentioned in claim No. 1 with one molecule of aniline, toluidine, xylidine, cumidine, alpha or beta naphthylamine, alpha or beta naphthol, resorcin, or the sulpho-acids of all these bodies, into bodies which contain the hydroxyl group, (40,) instead of the free diazo group, by boiling with water, and the coloring-matters thereby produced, as set forth.

9. The transformation of the compounds resulting from the operation of the processes stated in claim No. 8, which contain naphthylamine sulpho-acids, into colors containing the alpha or beta naphthol sulpho-acids, by diazotizing and boiling with water, and the coloring-matters thereby produced, as set forth.

In testimony whereof I have signed my name to this specification in the presence of two subscribing witnesses.

LUDWIG PAUL.

Witnesses:
CARL BORNGRAEBER,
ALFRED A. WHITMAN.